UNITED STATES PATENT OFFICE.

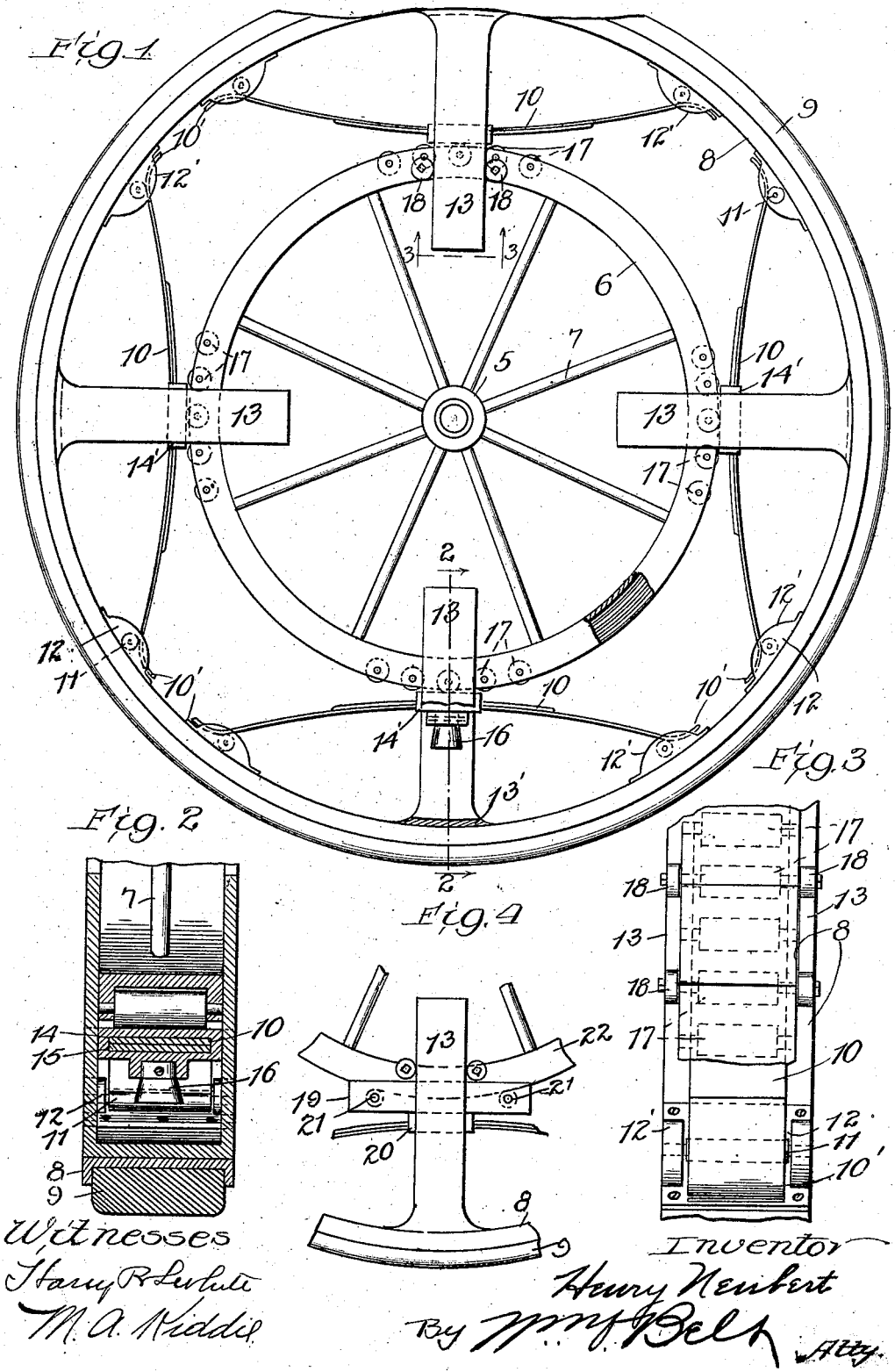

HENRY NEUBERT, OF CHICAGO, ILLINOIS.

SPRING-WHEEL.

No. 894,526.

Specification of Letters Patent.

Patented July 28, 1908.

Application filed April 27, 1907. Serial No. 370,579.

*To all whom it may concern:*

Be it known that I, HENRY NEUBERT, a citizen of the United States, residing at Chicago, in the county of Cook and State of Illinois, have invented new and useful Improvements in Spring-Wheels, of which the following is a specification.

This invention relates to resilient wheels for vehicles and constitutes certain improvements on the invention disclosed in my application Serial No. 355,631 filed February 4, 1907.

The object of the invention is to provide a strong and substantial resilient vehicle wheel and this I accomplish without the necessity for slotting the springs and the felly or inner rim as described in my former application.

In the accompanying drawings illustrating the invention Figure 1 is an elevation of a wheel embodying the invention and showing certain parts in section to more clearly illustrate the construction. Fig. 2 is a detail sectional view on the line 2—2 of Fig. 3. Fig. 3 is a detail view of a portion of the wheel as seen by one looking in the direction indicated by the arrows on the line 3—3 of Fig. 1, and partly broken away. Fig. 4 is a detail view showing another embodiment of the invention.

Referring to the drawings the wheel comprises a central structure consisting of the hub 5, the felly 6 and the spokes 7, and 8 is a rim and 9 is a tire, preferably a solid rubber tire. A plurality of semi-elliptical leaf springs 10 are located between the felly and the rim, and the ends 10' of these springs are curved backward and ride on anti-friction rollers 11 mounted in frames 12. The sides 12' of each frame project upward alongside of the edges of the curved end of the spring and form guides to hold the end of the spring in proper position. The felly may be made of channel iron as shown in Figs. 1 and 2 or it may be made solid as shown in Fig. 4. U-shaped guides 13 are fastened to the rim 8 midway between each pair of anti-friction rollers 11 and project inwardly and radially to receive the spring and felly. A movable block 14 is provided with a central opening 15 to receive the spring and is arranged to move longitudinally of the guide, being provided at its corners with ears 14' to prevent displacement from the guide. A cushion or buffer 16 is secured to the bottom of each block to engage the head 13' of the guide if the spring should be forced down so far, and this cushion or buffer can be made of rubber or other material and in any suitable manner. A plurality of rollers 17 are arranged in the channel of the felly 6 to ride on the block 14. A pair of guide rollers 18 is arranged on each side of the felly to engage the side edges of one of the guides 13. Thus it will be seen that the felly can move longitudinally on all of the guides and laterally on all of the guides except the one provided with the guide rollers 18, and this prevents the felly from turning relatively to the rim.

In the construction of Fig. 4 the rollers 17 are omitted and a shoe 19 is interposed between the block 20 and rollers 21 on the outer face of the solid felly 22. This shoe is made of channel iron and its sides extend inwardly and partly inclose the felly.

My improved resilient wheel is strong and substantial in construction and is made without slotting the springs or the felly. The weight on the axle is shifted from one spring to another imperceptibly and the construction and arrangement of parts is such that shocks or jars due to inequalities of the road are entirely absorbed by the springs, thereby greatly reducing the wear and tear on the vehicle. Any number of springs and guides may be employed as found desirable and I do not limit myself to the particular construction and arrangement of parts herein shown and described but reserve the right to make all such changes as fairly fall within the spirit and scope of the invention.

What I claim and desire to secure by Letters Patent is:

1. A spring wheel comprising a central structure including a hub and a felly, a rim, a plurality of semi-elliptical springs located between the felly and rim, guides secured to the rim and extending radially to the wheel and partly inclosing the springs and felly, and blocks on the springs and movable in said guides.

2. A spring wheel comprising a central structure including a hub and a felly, a rim, a plurality of semi-elliptical springs located between the felly and rim, U-shaped guides secured to the rim and extending radially to the wheel and partly inclosing the springs and felly, blocks movable longitudinally of the guides and provided with openings to receive the springs, and ears on said blocks to hold them in place in the guides.

3. A spring wheel comprising a central structure including a hub and a felly, a rim, a plurality of semi-elliptical springs located between the felly and rim, U-shaped guides secured to the rim and extending radially to the wheel and partly inclosing the springs and felly, and a plurality of rollers on the felly adjacent to each spring.

HENRY NEUBERT.

Witnesses:
WM. O. BELT,
M. A. KIDDIE.